US005588106A

United States Patent [19]

Habata

[11] Patent Number: 5,588,106

[45] Date of Patent: Dec. 24, 1996

[54] HARDWARE ARRANGEMENT FOR CONTROLLING MULTIPLE OVERLAPPING WINDOWS IN A COMPUTER GRAPHIC SYSTEM

[75] Inventor: Shinichi Habata, Tokyo, Japan

[73] Assignee: NEC Corporation, Tokyo, Japan

[21] Appl. No.: 106,561

[22] Filed: Aug. 16, 1993

[51] Int. Cl.[6] .................... G06T 1/20

[52] U.S. Cl. .................... 395/340; 395/326

[58] Field of Search .................... 395/157, 158, 395/162, 154, 163; 345/119, 120

[56] References Cited

U.S. PATENT DOCUMENTS

| | | | |
|---|---|---|---|
| 4,769,762 | 9/1988 | Tsujido | 395/157 |
| 4,806,919 | 2/1989 | Nakayama et al. | 345/120 |
| 5,129,055 | 7/1992 | Yamazaki et al. | 395/158 |
| 5,257,348 | 10/1993 | Roskowski et al. | 395/157 |
| 5,276,437 | 1/1994 | Horvath et al. | 345/119 |
| 5,388,201 | 2/1995 | Hourvitz et al. | 395/157 |
| 5,471,577 | 11/1995 | Lightbody et al. | 395/157 |

*Primary Examiner*—Raymond J. Bayerl
*Assistant Examiner*—Crescelle N. dela Torre
*Attorney, Agent, or Firm*—Foley & Lardner

[57] ABSTRACT

An arrangement for displaying a plurality of video images in multiple windows in a computer graphics system, is described. A CPU (Central Processing Unit) is coupled to a system bus and controls an overall operation of the arrangement. A frame buffer is provided to store one frame video image to be displayed on a display. A plurality of video data capture units acquire respectively a plurality of video images into the arrangement. A plurality of window pixel data transfer controllers are interconnected respectively between the bus and the video data capture units. The window pixel data transfer controllers are arranged to respectively define windows and arranged to respectively transfer the video images to the frame buffer by way of the corresponding windows. A given window pixel data transfer controller of the above-mentioned data transfer controllers is arranged to determine an exposed portion of the corresponding window in the case where the window is overlapped by another window. The given data transfer controller allows the corresponding video image to be supplied to the frame buffer through the exposed portion of the window.

7 Claims, 12 Drawing Sheets

FIG. 7
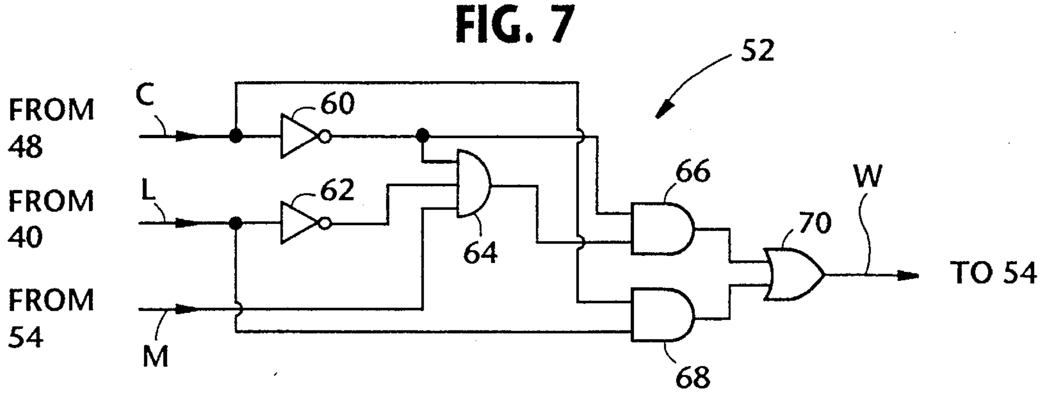
FIG. 8
| OUTPUT OF COMP 48 (SIGNAL C) | OUTPUT OF BUFFER 40 (SIGNAL L) | OUTPUT OF BITMAP 54 (SIGNAL M) | OUTPUT OF CONT 52 (SIGNAL W) |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 0 |
| 1 | 0 | 1 | 0 |
| 1 | 1 | 0 | 1 |
| 1 | 1 | 1 | 1 |
FIG. 9
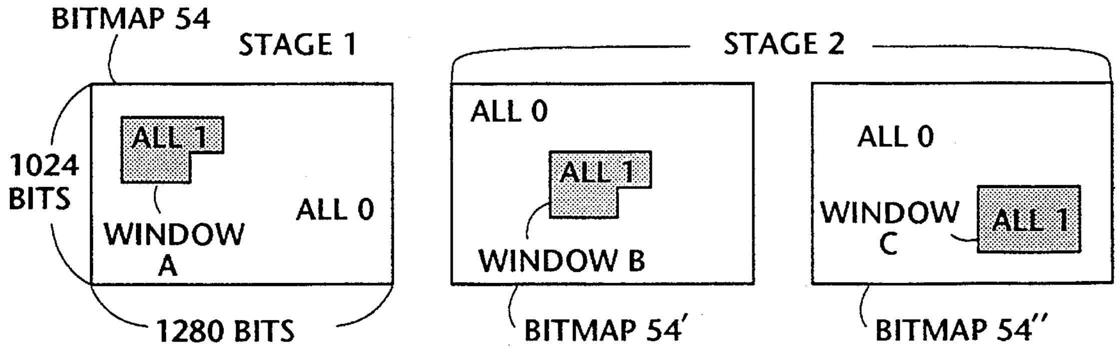

HARDWARE ARRANGEMENT FOR CONTROLLING MULTIPLE OVERLAPPING WINDOWS IN A COMPUTER GRAPHIC SYSTEM

BACKGROUND OF THE INVENTION

1. Field of the Invention

The present invention relates generally to techniques for processing a multiple windows display in a computer graphics system, and more specifically to an arrangement for selectively supplying a frame buffer with pixel data which are to be displayed in exposed portions of multiple overlapping windows. The present invention is able to effectively accelerate the overall speed of a multiple windows display system.

2. Description of the Related Art

The ability to display multiple overlapping windows which are controlled by separate applications, has become a necessity in a multimedia information processing system. Without hardware support for this capability, the overall speed of a multiple windows display may suffer seriously.

Before turning to the present invention, it is deemed advantageous to discuss related techniques with reference to FIGS. 1 to 4.

FIG. 1 is a block diagram schematically showing a conventional arrangement for displaying multiple windows which are respectively provided for separate applications.

The arrangement of FIG. 1 includes three (3) video data capture units 10, 12 and 14, a CPU (Central Processing Unit) 16, a main memory 18, a keyboard (viz., man-machine interface) 20, a frame buffer 22, a video controller 23, and a display 24. The blocks other than the video controller 23 and the display 24, are operatively coupled to a system bus 26. As is known, the video controller 23 displays the video image, defined in the frame buffer 22, on the display 24.

Each of the video data capture units 10, 12 and 14 is provided to obtain video images from corresponding video sources. A video data capture unit per se is well known in the art and does not directly relate to the present invention and, therefore, further discussion thereof will be omitted for the sake of simplifying the instant disclosure.

FIG. 2 shows schematically a location of each of three windows A, B and C which are separately opened on the display 24 (or stored in the frame buffer 22) of 1024×1280 pixels merely by way of example. It is assumed that the windows A, B and C are generated to display pixel data which are supplied from the units 10, 12 and 14 (FIG. 1), respectively.

FIG. 3 illustrates the situation wherein windows A, B and C are simultaneously opened on the display 24 and wherein window B overlaps window A while window C overlaps window B.

FIG. 4 illustrates obscured or hidden portions of each of the windows A and B. In this case, the hidden portions are respectively depicted as hatched portions X and Y, respectively.

The operations of the arrangement of FIG. 1 will now be briefly described.

The CPU 16 first allows pixel data (viz., graphics information), which are obtained from the video data capture unit 10 and defined by window A, to be loaded into the frame buffer 22. Following this, the CPU 16 writes pixel data, which are obtained from the video data capture unit 12 and defined by window B, into the frame buffer 22. Thus, the information in the hatched portion X is overwritten by the information of window B. Subsequently, the CPU 16 writes pixel data, which are obtained from the video data capture unit 14 and defined by window C, into the frame buffer 22. Therefore, the information of window B, which has been stored in the hatched portion Y, is overwritten by the pixel data of the corresponding area of window C.

In the operations mentioned above, when the pixel data are transferred from the video data capture units 10, 12 and 14 to the frame buffer 22, the CPU 16 writes window background information, associated with each of the windows A, B and C, into the frame buffer 22. It should be noted however, that writing the window background information into the frame buffer 22, is not directly concerned with the present invention.

After the pixel data transfer from the units 10, 12 and 14 to the frame buffer 22 under the control of the CPU 16, the pixel data in the exposed portions of the windows A, B and C are displayed on the display 24 as shown in FIG. 3.

However, the arrangement of FIG. 1 has suffered from the problem in that the pixel data, which are not actually displayed (viz., data in the hatched portions X and Y of FIG. 4 in this particular case), are unnecessarily loaded into the frame buffer 22. The transfer of the pixel data, which are not actually displayed, to the frame buffer 22, represents an unnecessary load and leads to degradation of the overall speed of the multiple windows processing. It is understood that as the obscured portions of the multiple windows increase in size, a noticeable increase in the amount of time wasted in transferring the non-displayed data to the frame buffer 22 occurs. It is therefore highly desirable to write only the pixel data, which is actually going to be displayed, into the frame buffer 22.

SUMMARY OF THE INVENTION

It is an object of the present invention to provide improved techniques by which only video pixel data which are actually displayed are transferred to a frame buffer.

In brief, this object is achieved by an arrangement for displaying a plurality of video images in multiple windows in a computer graphics system, is described. A CPU (Central Processing Unit) is coupled to a system bus and controls an overall operation of the arrangement. A frame buffer is provided to store one frame video image to be displayed on a display. A plurality of video data capture units acquire respectively a plurality of video images into the arrangement. A plurality of window pixel data transfer controllers are interconnected respectively between the bus and the video data capture units. The window pixel data transfer controllers are arranged to respectively define windows and arranged to respectively transfer the video images to the frame buffer by way of the corresponding windows. A given window pixel data transfer controller of the above-mentioned data transfer controllers is arranged to determine an exposed portion of the corresponding window in the case where the window is overlapped by another window. The given data transfer controller allows the corresponding video image to be supplied to the frame buffer through the exposed portion of the window.

More specifically, an aspect of the present invention resides in an arrangement for displaying a plurality of video images in multiple windows in a computer graphics system, comprising: first means for controlling an overall operation of said arrangement, said first means being coupled to a bus; second means for storing one frame video image to be displayed on a display, said second means being coupled to said bus; third means for displaying said one frame video image defined in said second means on said display, said third means being operatively coupled to said second means; first to N-th (where N is a positive integer equal to or larger than two) fourth means for acquiring first to N-th video images into said arrangement, respectively; and first to N-th fifth means interconnected respectively between said bus and said first to N-th fourth means, said first to N-th fifth means being arranged to respectively define first to N-th windows and being arranged to respectively transfer said first to N-th video images to said second means through said first to N-th windows, M-th (where M is a positive integer equal to or smaller than N) fifth means of said first to N-th fifth means being arranged to determine an exposed portion of M-th window in the case where said M-th window is overlapped by another window and allowing the M-th video image to be supplied to said second means through said exposed portion of said M-th window.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 7 is a block diagram of logic circuitry used in one of the blocks of FIG. 5A;

FIG. 8 is a truth table which defines the operations of the logic circuit of FIG. 7.

FIGS. 9 to 17 are sketches which describe the operations of the arrangements shown in FIGS. 5B–5D;

DETAILED DESCRIPTION OF THE PREFERRED EMBODIMENTS

A first preferred embodiment of the present invention will be discussed with reference to FIGS. 5A–17.

Figure 5A:
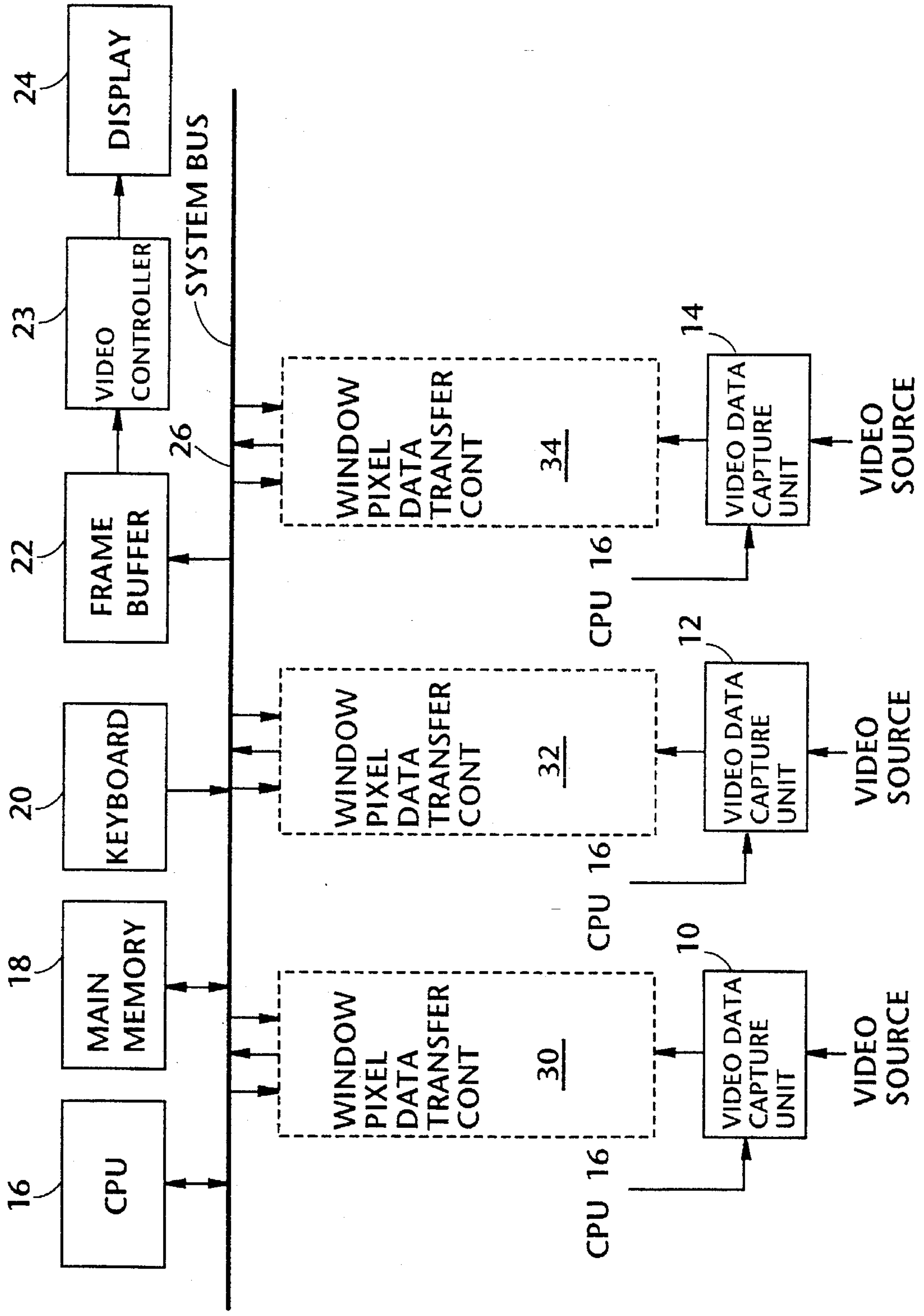
FIG. 5A is a block diagram showing a first embodiment of the present invention and blocks associated therewith.

FIG. 5A is a block diagram which schematically shows an overall arrangement of the first embodiment.

Figure 1:
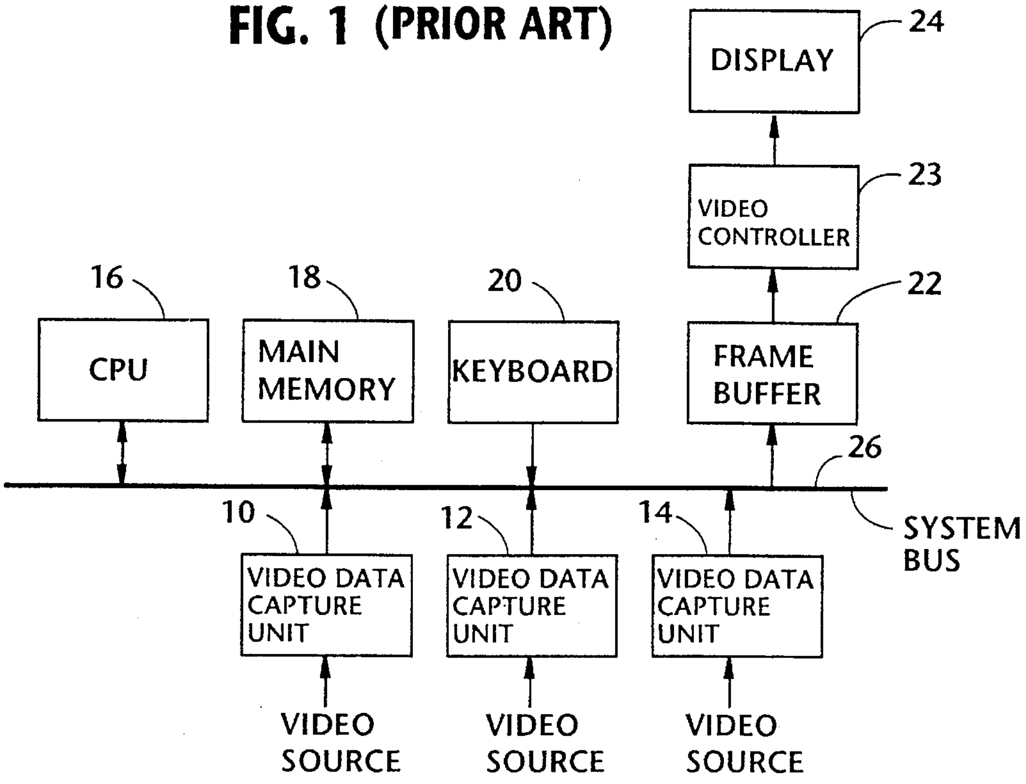
FIG. 1 (PRIOR ART)
FIG. 1 is a block diagram schematically illustrating the previously discussed hardware arrangement wherein multiple overlapping windows are processed.
Figure 2:
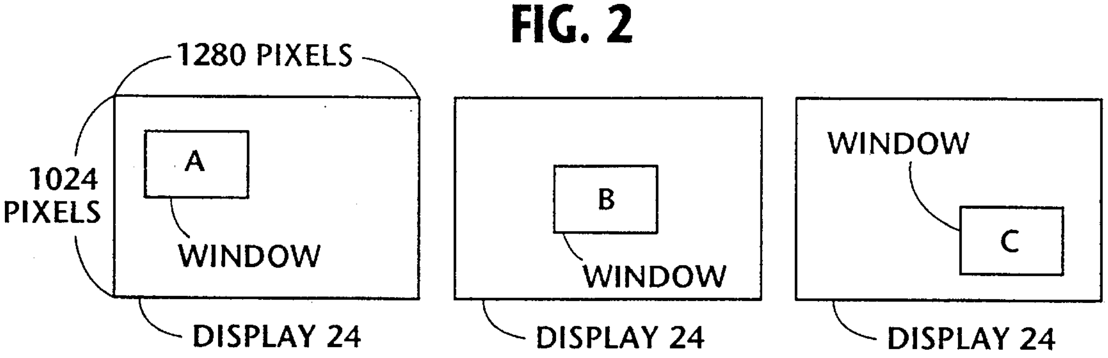
FIG. 2 is a sketch schematically showing each of three windows which are displayed on a screen.
Figure 3:
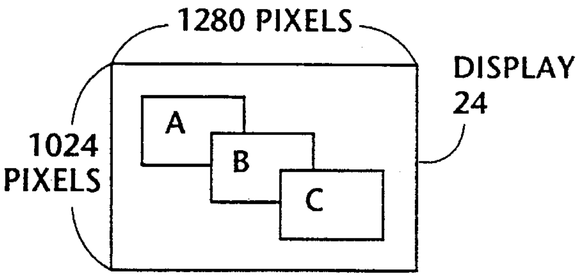
FIG. 3 is a sketch showing the three windows as they appear on a display.
Figure 4:
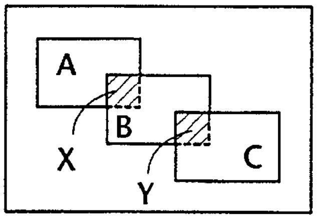
FIG. 4 is a sketch showing the overlapped portions of the windows shown in FIG. 3.

The arrangement of FIG. 5A differs from that shown in FIG. 1 in that the former arrangement further includes a plurality of window pixel data transfer controllers 30, 32 and 34 which are respectively interconnected between the system bus 26 and the video data capture units 10, 12 and 14. Although the three (3) controllers 30, 32 and 34 are provided in FIG. 5A, the number thereof varies depending on the number of applications (viz., windows) which are simultaneously opened.

Merely by way of example, it is assumed that: (a) the frame buffer 22 is provided with memory capacity of 1024×1280 pixels; and (b) the display 24 is able to display 1024×1280 pixels.

Figure 5B:
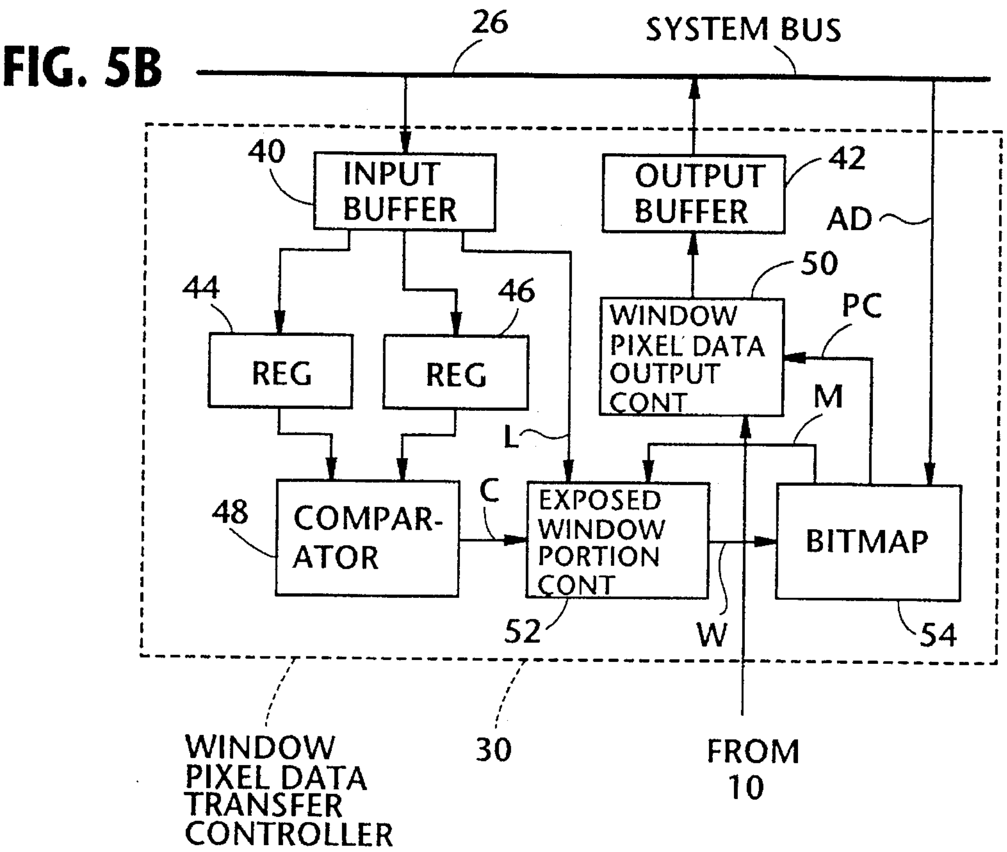
FIG. 5B–5D are block diagrams showing details of the blocks depicted in FIG. 5.

FIG. 5B is a block diagram showing the arrangement of the window pixel data transfer controller 30 (FIG. 5A) in detail. As shown in FIG. 5B, the controller 30 includes an input buffer 40, an output buffer 42, two registers 44 and 46, a comparator 48, a window pixel data output controller 50, an exposed window portion controller 52, and a bitmap 54, all of which are coupled as illustrated. The bitmap 54 is provided with a capacity of 1024×1280 bits in order to meet the capacity of the frame buffer 22 in this particular case.

Figure 5C:
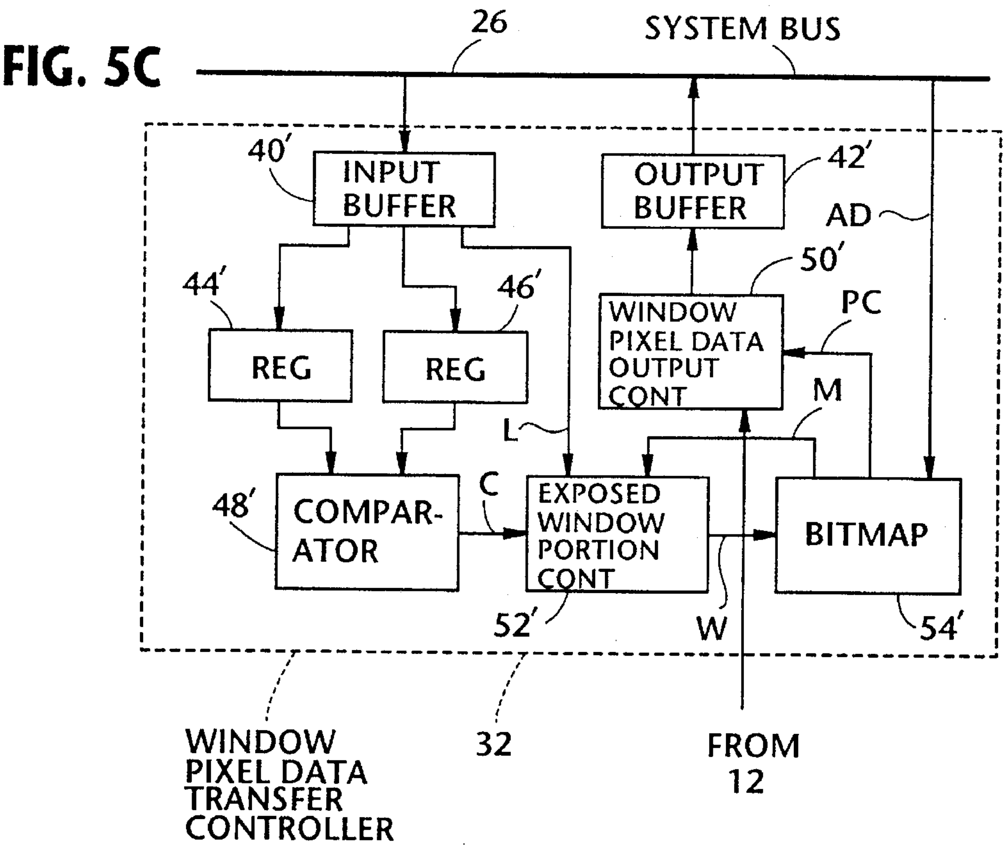
Figure 5D:
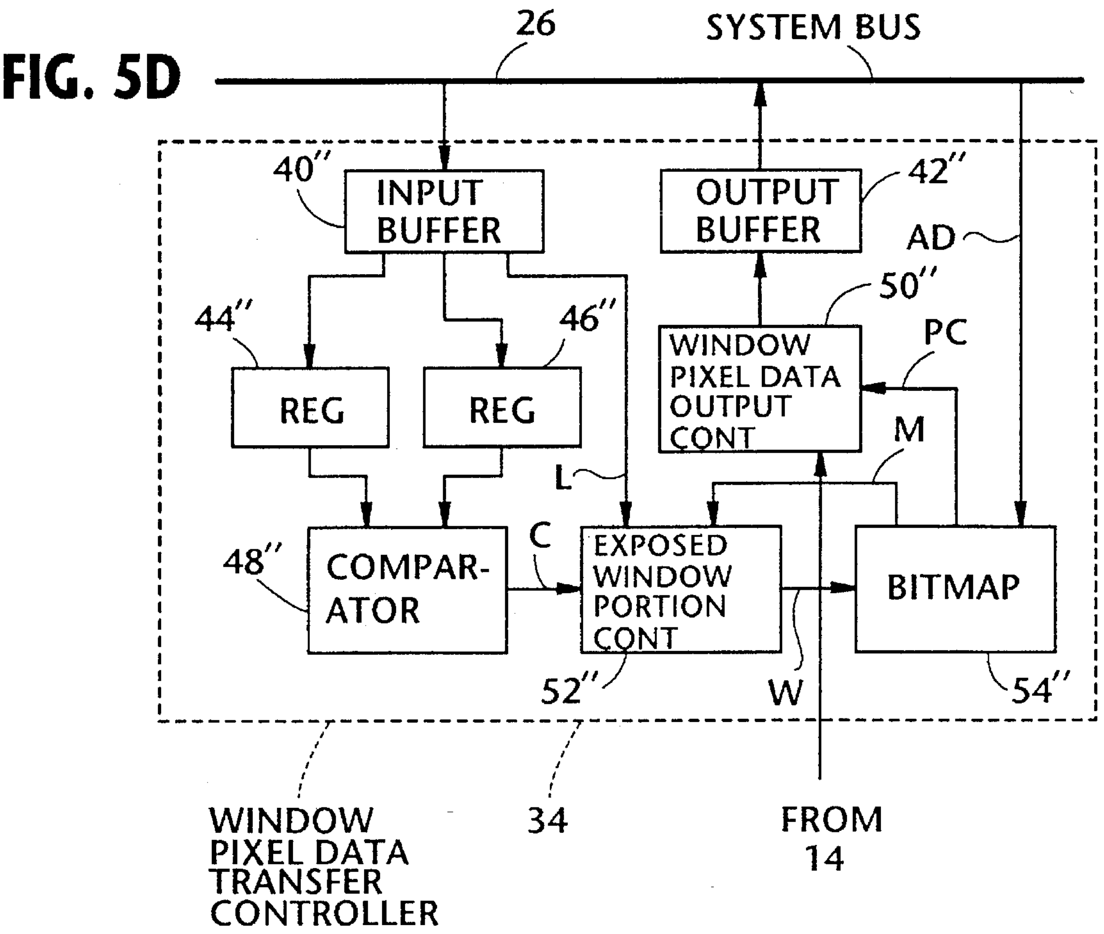

FIGS. 5C and 5D show respectively the details of the other two controllers 32 and 34 in block diagram form. As seen from FIGS. 5C and 5D, each of the controllers 32 and 34 is configured in exactly the same manner as the controller 30. However, merely for the convenience of description, each of the blocks of the controller 32 is denoted by numeral of the counterpart of the controller 30 plus a prime ('), while each of the blocks of the controller 34 is denoted by numeral of the counterpart of the controller 30 plus two primes ("). On the other hand, signals C, L, M, W, AD, and PC appearing in the arrangements of FIGS. 5B, 5C and 5D, are not discriminated among the arrangements of FIGS. 5A–5C. This is because each of these arrangements operates in exactly the same manner.

Figure 6:
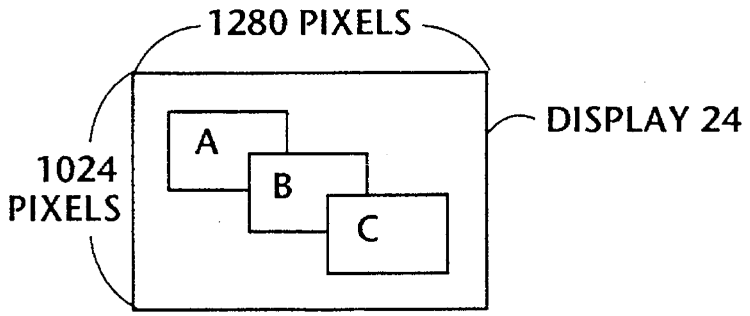
FIG. 6 is a sketch showing three windows which are simultaneously opened on a display.

For the convenience of discussion, it is further assumed that:

(a) three windows A, B and C are concurrently opened on the display 24 in a partially overlapped manner as shown in FIG. 6;

(b) the bitmaps 54 and 54' are respectively provided to determine the obscured (viz., hidden) portions of windows A and B;

(c) the bitmap 54" defines window C on top of windows A and B in this particular case; and (d) pixel data obtained from the video data capture units 10, 12 and 14 are respectively transferred to the frame buffer 22 under the control of the controllers 30, 32 and 34.

FIG. 7 is a block diagram showing a logic circuit of the exposed window portion controller 52 of the controller 30 (FIG. 5B). Although not shown, each of the other controllers 52' and 52" (FIGS. 5C and 5D respectively) is configured in exactly the same manner as the controller 52.

As shown in FIG. 7, the controller 52 includes two inverters 60 and 62, three AND gates 64, 66 and 68, and an OR gate 70.

In FIG. 7, the inverter 60 receives the signal C (viz., the output of the comparator 48) which indicates the result of the comparison of the contents of the registers 44 and 46. The inverter 62 receives the signal L which indicates window defining bits which are applied, on a bit by bit basis, from the CPU 16 via the input buffer 40. The outputs of the inverters 60 and 62 are applied to the AND gate 64 to which the signal M is also applied from the bitmap 54. Further, the AND gate 66 is arranged to receive the inverted logic level of the signal C and the output of the AND gate 64, while the AND gate 68 is supplied with the signals C and L. Finally, the OR gate 70 receives the outputs of the AND gates 66 and 68 and produces the signal W which is applied to the bitmap 54.

FIG. 8 is a truth table which defines the operations of the logic circuit of FIG. 7.

The operations of the first embodiment will be discussed in accordance with general classifications as stages:

STAGE 1: specifying the exposed portion of window A in the bitmap 54 (see FIG. 9);

STAGE 2: specifying the exposed portion of window B in the bit map 54' and also specifying window C in the bit map 54" (see FIG. 9); and STAGE 3: supplying the frame buffer 22 with the video data obtained from the units 10, 12 and 14 under the control of the controllers 30, 32 and 34, respectively.

Figure 10:
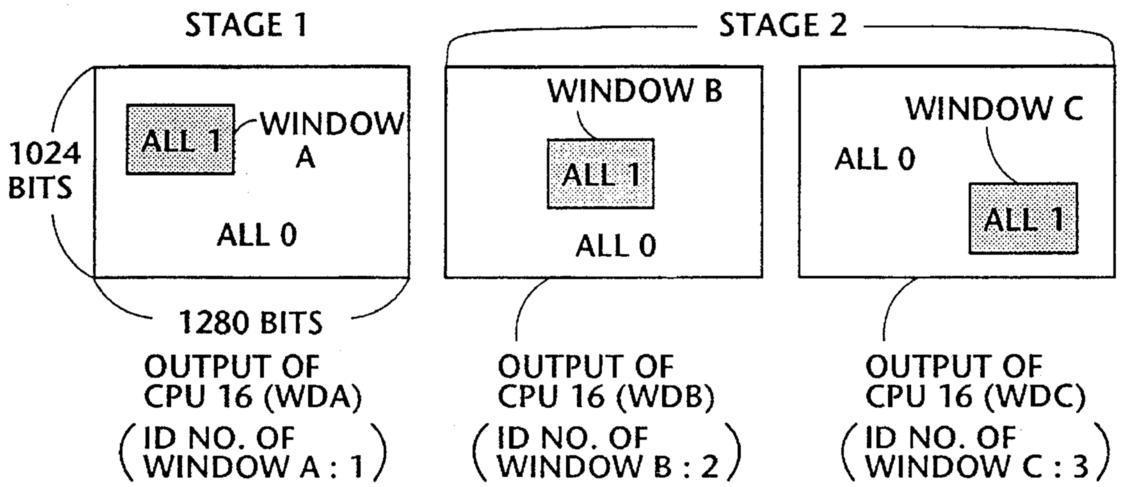

FIG. 10 graphically shows "window defining frame data" WDA, WDB and WDC which are outputted in this order from the CPU 16 during the above-mentioned STAGE 1 and STAGE 2. Each of the windows A, B and C is defined, within the corresponding frame, by logic 1s (depicted by "ALL 1") as shown in FIG. 10. The window frame defining data WDA is applied to all of the exposed window portion controllers 52, 52' and 52" during STAGE 1. The other two window defining frame data WDB and WDC are applied, during STAGE 2, to all of the controllers 52, 52' and 52" in this order. Each of the frame data WDA, WDB and WDC includes 1024×1280 bits which are generated on a bit by bit basis from the CPU 16 from top to bottom and from the upper leftmost bit to the lower rightmost bit (viz., in a manner similar to horizontal raster scan).

Further, as shown in FIG. 10, the windows A, B and C are respectively assigned window ID (Identification) numbers 1, 2 and 3 (viz., 01, 10 and 11 in binary notation) in the order of overlap when the windows A, B and C are opened or displayed on the display 24 (see FIG. 6).

Figure 11:
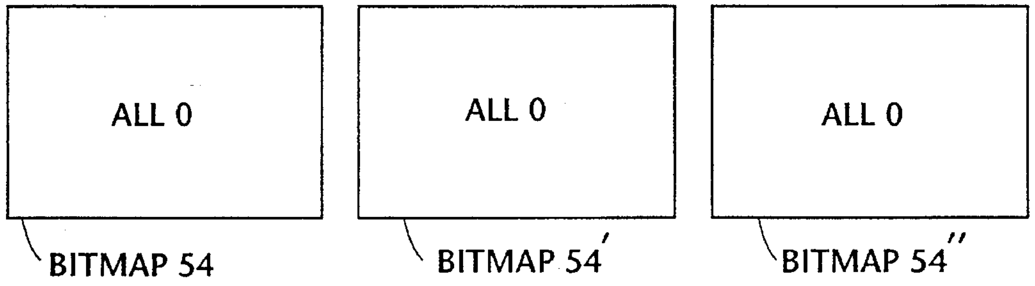

Prior to executing the window pixel data transfer control according to the first embodiment, the CPU 16 writes a logic 0 into all the bit positions of the bitmaps 54, 54' and 54" as illustrated in FIG. 11. However, resetting the bitmaps 54, 54 and 54" by writing all zero thereinto, is not necessarily required as will be discussed later.

Returning to FIG. 8, a logic 1 of the signal C (viz., the output of the comparator 48) indicates coincidence between the contents of the registers 44 and 46, while a logic 0 of the signal C indicates non-coincidence therebetween. On the other hand, a logic 1 of the signal L indicates that the corresponding bit position of the frame is within the window, while a logic 0 thereof indicates that the bit position is outside the window. Further, the signal M indicates a binary data derived from the bitmap 54, whose bit position corresponds to the position of a bit of the signal L concurrently applied to the logic circuit of FIG. 7.

Figure 12:
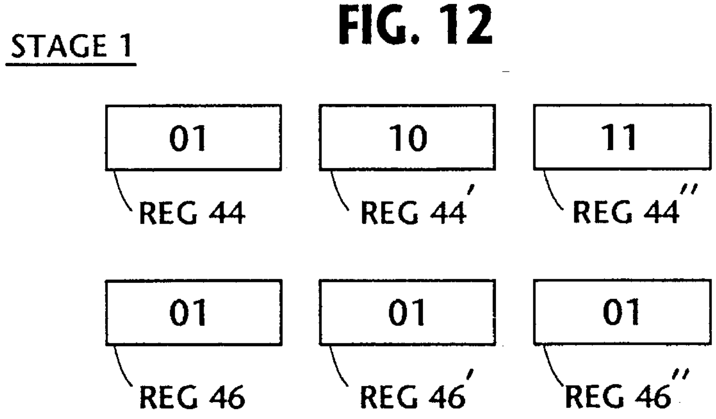

The operations of STAGE 1 will now be discussed. As shown in FIG. 12, the CPU 16 writes the window ID numbers 01, 10, and 11 into the registers 44, 44', and 44" respectively, and, further writes the window ID number 01 into all of the registers 46, 46' and 46". Accordingly, during STAGE 1, the comparator 48 continues to generate the signal C which assumes a logic 1 (indicative of coincidence). On the other hand, each of the comparators 48' and 48" continues to generate, during STAGE 1, the signal C which assumes a logic 0 (indicative of non-coincidence). The signals C are applied to the corresponding exposed window portion controller 52, 52' and 52".

The CPU 16 supplies the controller 52 with the window defining frame data WDA (FIG. 10), on a bit by bit basis, via the input buffer 40. On the other hand, the bitmap 54 supplies the controller 52, on a bit by bit basis, with one frame of binary data stored therein using the address signal AD from the CPU 16. The address signal specifies each of the locations of one frame bit data stored in the bitmap 54. In more specific terms, the exposed window portion controller 52 receives the signals L and M which indicate the binary data located in the corresponding positions of the associated two frame data, respectively. The controller 52 supplies the bitmap 54 with the output thereof (viz., a logic 1 or 0) which is stored in the bit position whose binary data has been outputted as the signal M.

During the same period for which the CPU 16 applies the window defining frame data WDA to the controller 52, the CPU 16 also applies the same data WDA to the controllers 52' and 52". Thus, the same operations as mentioned above are implemented within the other two window pixel data transfer controllers 32 and 34.

Figure 13:
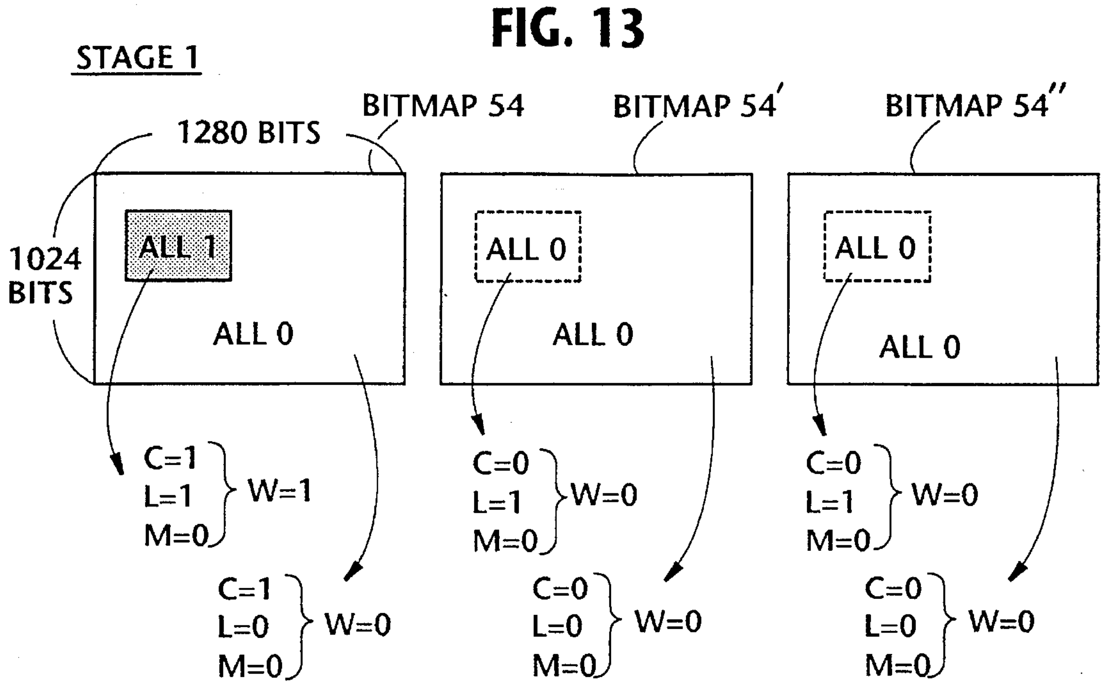

FIG. 13 shows the binary data in the bitmaps 54, 54' and 54" after each of the controllers 52, 52' and 52" complete the logical operations on the window defining frame data WDA applied thereto. The bitmaps 54, 54' and 54" eventually store the binary data as shown in FIG. 13. For better understandings, FIG. 13 represents the logic levels of the input signals C, L and M and the output signal W. As mentioned above, FIG. 8 shows the truth table which defines the operations of the controller 52 (also 52' and 52").

Figure 14:
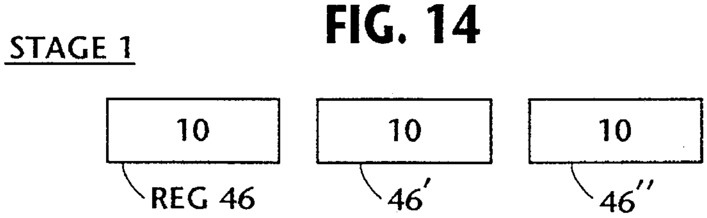

Following this, the CPU 16 writes the window ID number 10 (binary) into all of the registers 46, 46' and 46", as shown in FIG. 14. It should be noted that the other registers 44, 44' and 44" retain the window ID numbers 01, 10 and 11, as shown in FIG. 12. Thereafter, the CPU 16 supplies each of the controllers 52, 52' and 52" with the window defining frame data WDB (FIG. 10) on a bit by bit basis.

Figure 15:
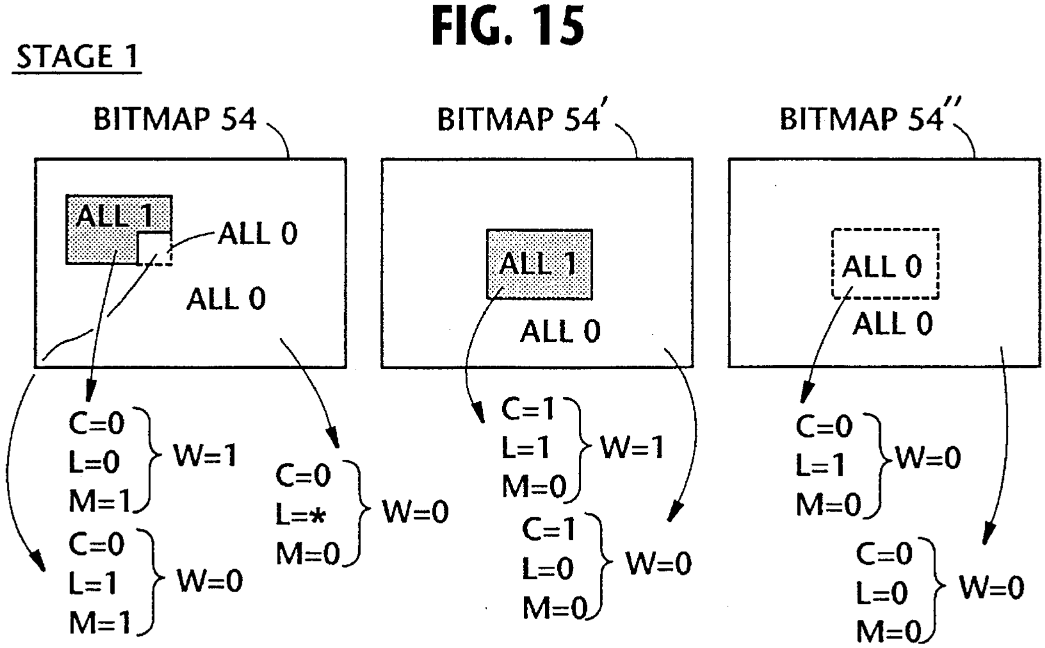

FIG. 15 shows the binary data in the bitmaps 54, 54' and 54" after the controllers 52, 52' and 52" respectively complete the logical operations on the binary frame data WDB applied thereto. As in FIG. 13, the logic levels of the inputs C, L and M are shown together with the output W. In FIG. 15, L=* implies that the signal L assumes either logic 0 or 1. Thus, the exposed portion of the window A is defined when STAGE 1 is completed as shown in FIG. 15.

Figure 16:
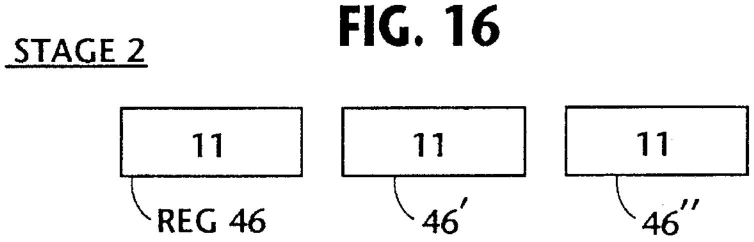

After STAGE 1, the CPU 16 writes the window ID number 11 (binary) into all of the registers 46, 46' and 46", as shown in FIG. 16. Thus, the operations enter STAGE 2. The registers 44, 44' and 44" retain the window ID numbers 01, 10 and 11 as shown in FIG. 12. Subsequently, the CPU 16 supplies each of the controllers 52, 52' and 52" with the window defining frame data WDC (see FIG. 10) on a bit by bit basis.

Figure 17:
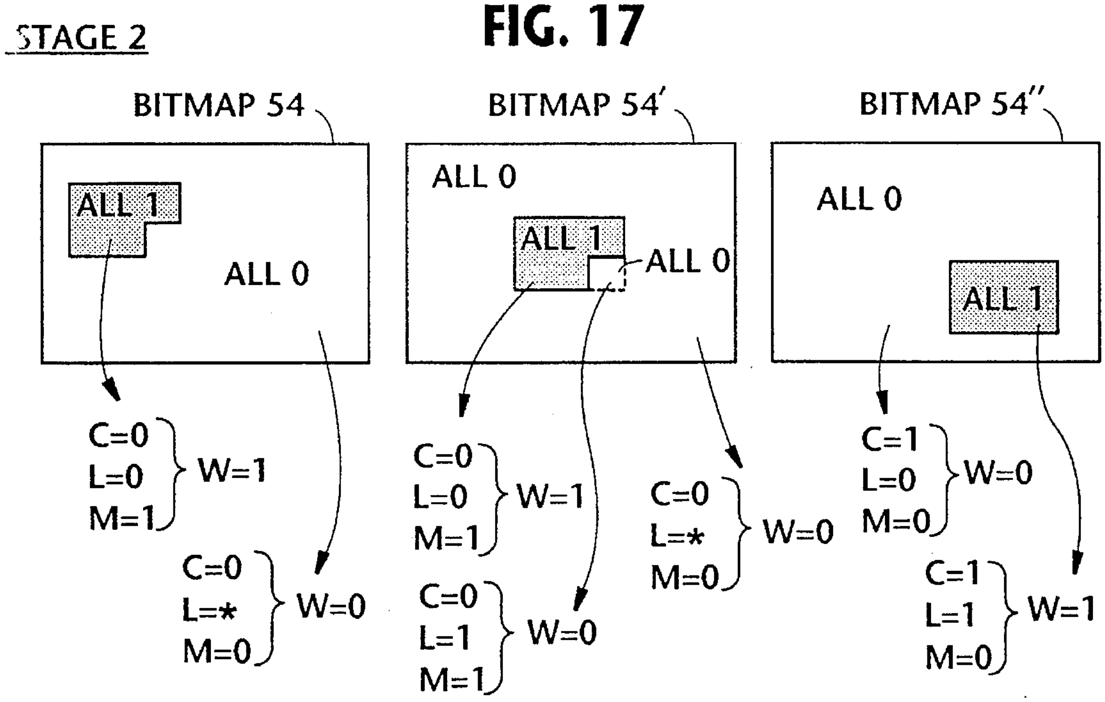

FIG. 17 shows the binary data in the bitmaps 54, 54' and 54" after the controllers 52, 52' and 52" respectively complete the logical operations on the window defining frame data WDC applied thereto. In FIG. 17, there are shown the logic levels of the inputs C, L and M together with the output W. Thus, when STAGE 2 is finalized, the exposed portions of windows A and B are respectively defined in the bitmaps 54 and 54". Further, window C is defined in the bitmap 54".

After STAGE 1 and STAGE 2, the CPU 16 applies the address signal AD to the bitmap 54 in order to sequentially read out the contents (viz., the signal PC) of the bitmap 54 (see FIG. 17) from top to bottom and from the upper leftmost binary data to the lower rightmost binary data. The CPU 16 also sequentially reads out one frame of pixel data from the video data capture unit 10 and applies same to the output controller 50. The binary and pixel data, applied to the output controller 50 from the bitmap 54 and the unit 10, have been located in the same positions within the frames. If the binary data (viz., the signal PC) from the bitmap 54 assumes a logic 1, the output controller 50 transfers the corresponding pixel data to the buffer frame 22 via the system bus 26. Contrarily, if the binary data from the bitmap 54 assumes a logic 0, the output controller 50 prevents the corresponding pixel data, applied from the unit 10, from being transferred to the frame buffer 22. Thus, the window pixel data transfer controller 30 is able to supply the frame buffer 22 with the video pixel data from the unit 10, which correspond to the exposed portion of window A.

The same operations of video pixel data transfer as mentioned above, are implemented by the other two window pixel data transfer controllers 32 and 34. That is, the controller 32 applies the video pixel data, which correspond to the exposed portion of window B, to the frame buffer 22. Similarly, the controller 34 supplies the frame buffer 22 with the video pixel data from the unit 12, which pixel data correspond to the entire portion of window C in this particular case.

During STAGE 3, the CPU 16 writes window background data into the frame buffer 22. However, this operation is not relevant to the present invention and thus the details thereof will be omitted for the sake of brevity.

In the above discussion, the CPU 16 initially resets the bitmaps 54, 54' and 54" (see FIG. 11) by writing logic 0s into the entire bit positions thereof. However, the exposed portions of windows A and B can be defined irrespective of the binary values of the signal M. Accordingly, resetting the bitmaps 54, 54' and 54" is not necessarily required. In this instance, there may be the binary data which assume logic 1s outside the exposed window portions. This means that the pixel data outside the exposed window portions are relayed to the frame buffer 22 from the units 10, 12 and 14. However, these pixel data stored in the frame buffer 22 are overwritten by the window background data from the CPU 16.

Figure 18:
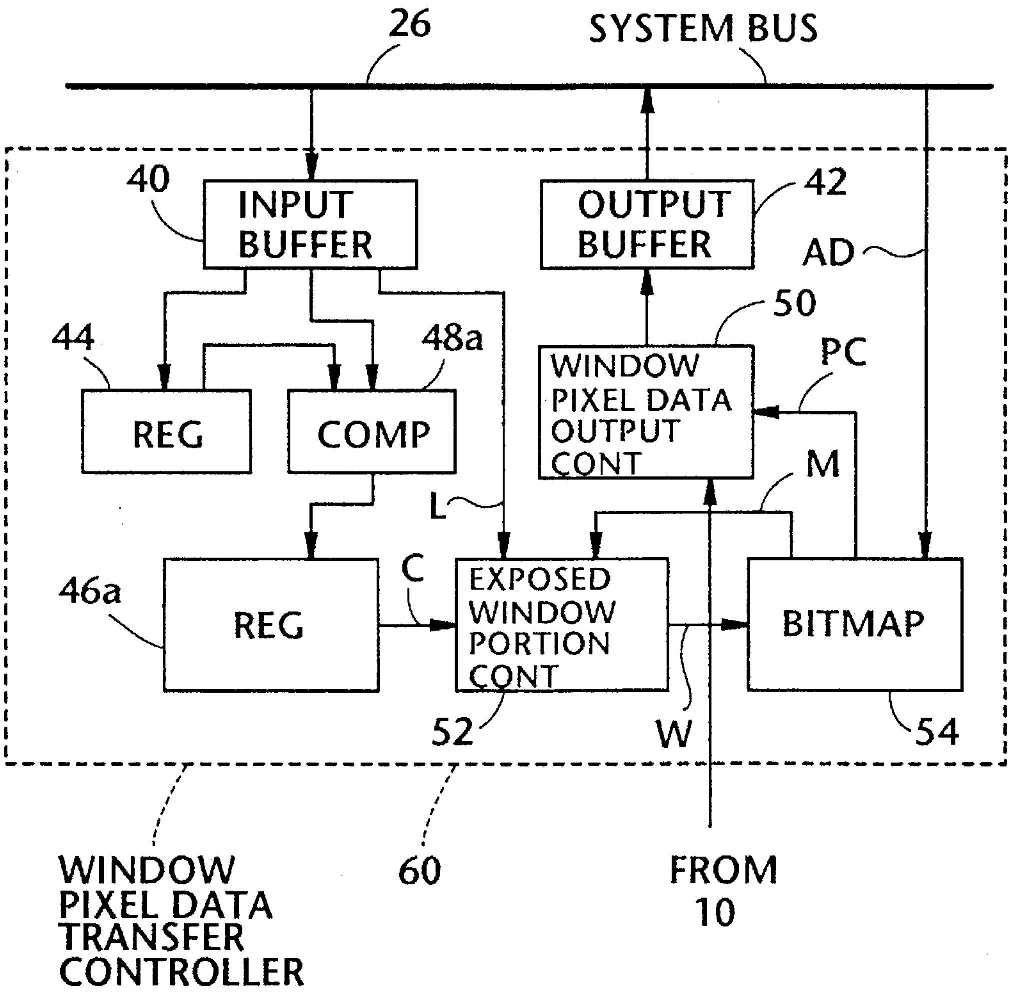
FIG. 18 is a block diagram showing a second embodiment of the present invention.

FIG. 18 is a block diagram showing a second embodiment of the present invention. The arrangement shown in FIG. 18, depicted by numeral 60, is identical to each of the controllers 30, 32 and 34 except that the comparator 48 and the register 46 (in the case of the controller 30) are exchanged. In FIG. 18, the comparator is denoted by "48*a*" while the register exchanged in position with the comparator **48*a*** is depicted by "46*a*".

As shown in FIG. 18, the comparator **48*a* is arranged to compare the content of the register 44 and the output applied by the CPU 16 via the input buffer 40. Further, the register 46*a* stores the output of the comparator 46*a*. The operations of the arrangement of FIG. 18 are substantially the same as discussed with the first embodiment. For example, when the arrangement of FIG. 18 is applied to that of FIG. 5B, the comparator 48*a* outputs a logic 1 during STAGE 1, which is held in the register 46*a*. Thus, the exposed window portion controller 52 is supplied with a logic 1 during STAGE 1. Further descriptions of FIG. 18** are redundant and hence will be omitted for simplifying the instant disclosure.

A third embodiment of the present invention will be discussed with reference to FIGS. 19 and 20.

Figure 19:
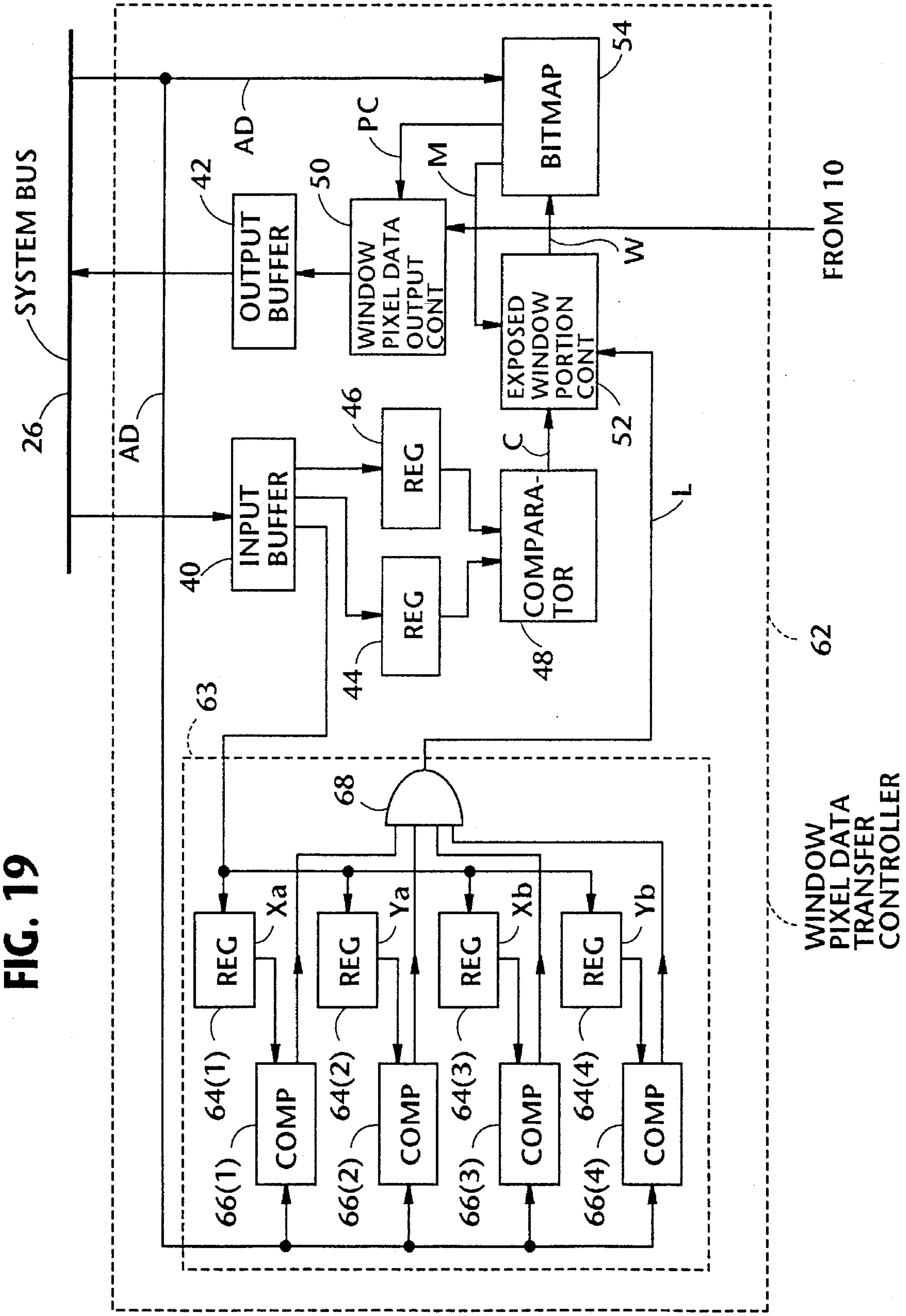
FIG. 19 is a block diagram showing a third embodiment of the present invention.

FIG. 19 is a block diagram showing a window pixel data transfer controller 62 which corresponds to the controller 30 of FIG. 5B. If the three windows A, B and C are demonstrated or opened concurrently on the display 24 as in the first embodiment, the third embodiment should be provided with three window pixel data transfer controllers each of which is configured in the exactly the same manner as shown in FIG. 19. All of the blocks shown in FIG. 5A, except for the controllers 30, 32 and 34, are employed with the third embodiment.

The arrangement of FIG. 19 differs from that of FIG. 5B in that the former arrangement further includes circuitry 63 which consists of four registers 64(1)–64(4), four comparators 66(1)–66(4), and an AND gate 68.

The arrangement of FIG. 19 will be discussed with reference to FIG. 20 which is a diagram schematically showing one frame of bit coordinates outputted from the CPU 16.

Figure 20:
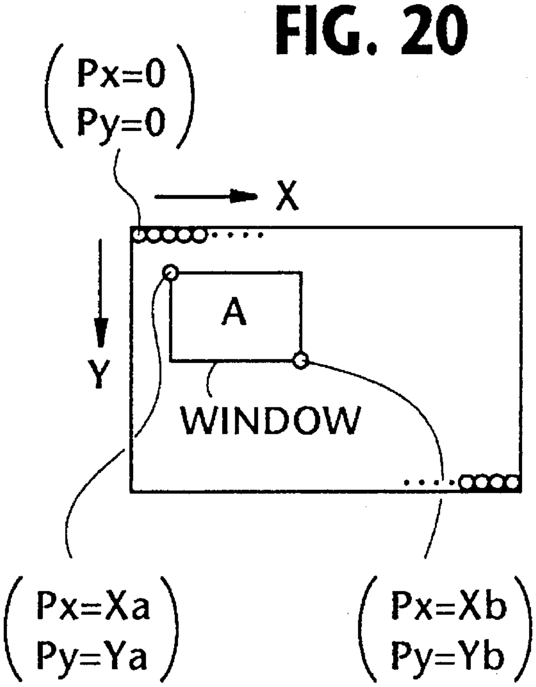
FIG. 20 is a sketch depicting the operations of the third embodiment of the present invention.

As shown in FIG. 20, the window A is defined by two bit coordinates. That is, one is the window's upper leftmost coordinate (Px=Xa, Py=Ya) while the other is the window's lower rightmost coordinate (Px=Xb, Py=Yb). The origin of the coordinates (Px=0, Py=0) is the upper leftmost corner bit of the frame in this case.

The third embodiment generates the signal L using the bit coordinates applied from the CPU 16. Other than this, the third embodiment operates in exactly the same manner as the first embodiment. Accordingly, only the manner wherein the signal L is generated, will only be described hereinlater.

Firstly, the CPU 16 writes Px=Xa, Py=Ya, Px=Xb and Px=Yb into the registers 64(1)–64(4), respectively. Subsequently, the CPU 16 applies the bit position address AD to both of the comparators 66(1)–66(4) and the bitmap 54.

The comparator 66(1) generates a logic 1 only if the bit coordinates applied directly from the CPU 16 is equal to or larger than Xa stored in the register 64(1). Similarly, the comparator 66(2) generates a logic 1 only if the bit coordinates applied directly from the CPU 16 is equal to or larger than Ya stored in the register 64(2). On the other hand, the comparator 66(3) generates a logic 1 only if the bit coordinates applied directly from the CPU 16 is equal to or smaller than Xb stored in the register 64(3). Further, the comparator 66(4) generates a logic 1 only if the bit coordinates applied directly from the CPU 16 is equal to or smaller than Yb stored in the register 64(4). Thus, if each of the comparators 66(1)–66(4) generates a logic 1, this situation implies that the bit coordinate (viz., the address signal AD) applied from the CPU 16 is in window A.

The outputs of the comparators 66(1)–66(4) are applied to the AND gate 68 which issues the signal L which assumes a logic 1 if all of the comparators 66(1)–66(4) generates logic 1s. Otherwise, the output of the AND gate 68 (viz., the signal L) assumes a logic 0.

As mentioned above, the remaining operations of the third embodiment are the same as in the first embodiment.

A fourth embodiment of the present invention will be discussed with reference to FIGS. 21 and 22.

Figure 21:
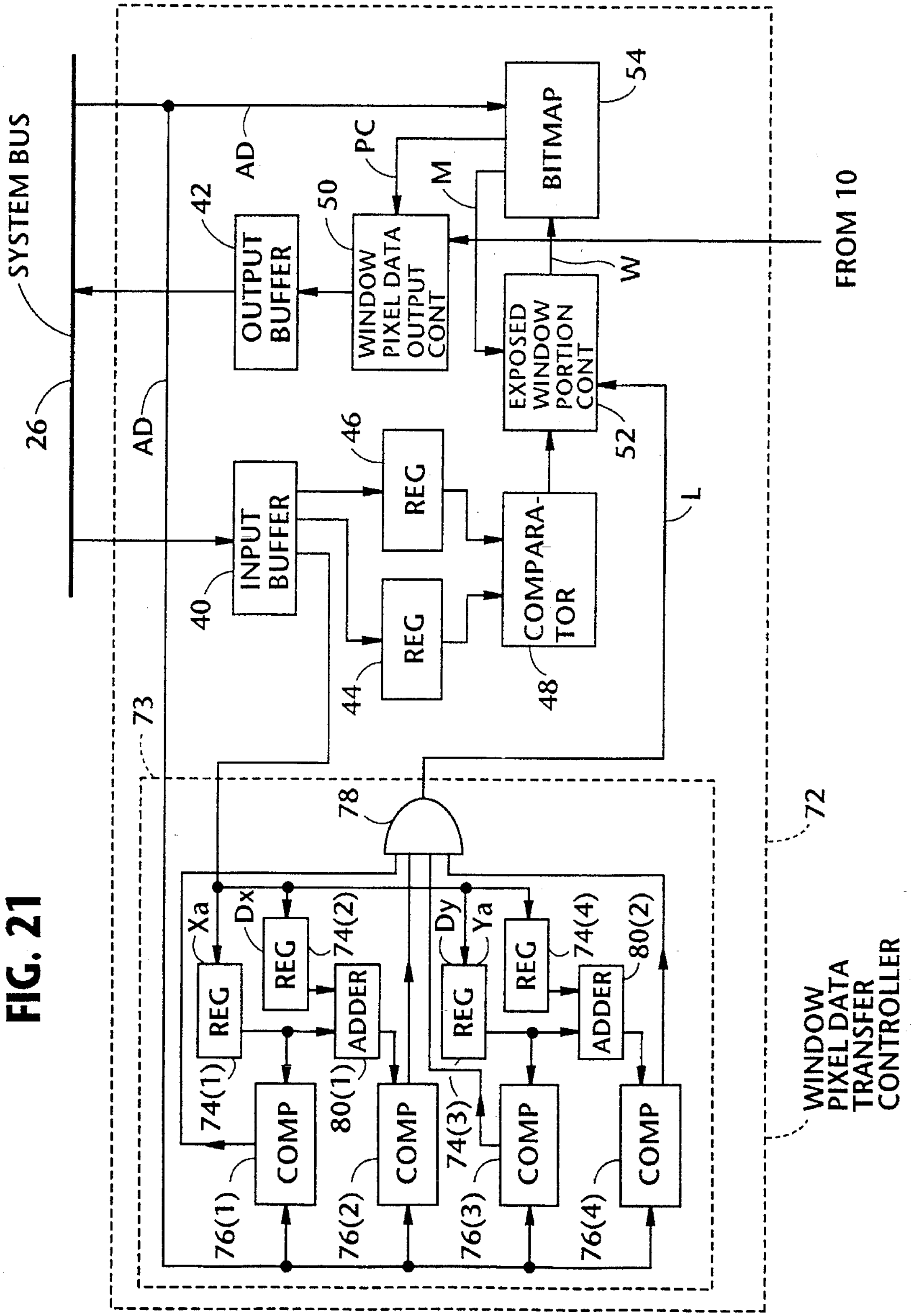
FIG. 21 is a block diagram showing a fourth embodiment of the present invention.

FIG. 21 is a block diagram showing a window pixel data transfer controller 72 which corresponds to the controller 30 of FIG. 5B and whose operations are similar to the controller 62 of FIG. 19. If the three windows A, B and C are to be opened concurrently on the display 24 as in the first embodiment, the fourth embodiment should be provided with three window pixel data transfer controllers each of which is configured in the exactly the same manner as shown in FIG. 21. All of the blocks shown in FIG. 5A, except for the controllers 30, 32 and 34, are employed with the fourth embodiment.

The arrangement of FIG. 21 differs from that of FIG. 5B in that the former arrangement further includes circuitry 73 which consists of four registers 74(1)–74(4), four comparators 76(1)–76(4), an AND gate 78, and two adders 80(1)–80(2).

The arrangement of FIG. 21 will be discussed with reference to FIG. 22 which is a diagram schematically showing one frame of bit coordinates outputted from the CPU 16.

Figure 22:
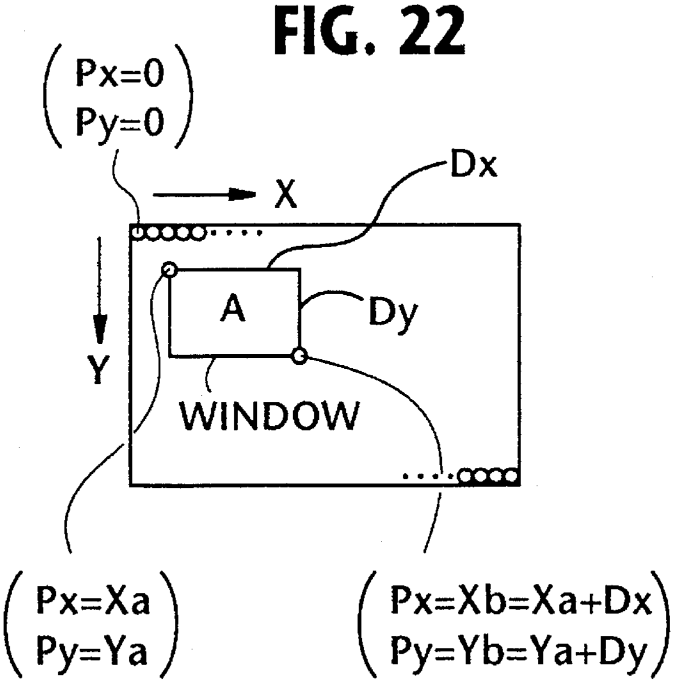
FIG. 22 is a sketch depicting the operations of the fourth embodiment of the present invention.

As shown in FIG. 22, window A is defined by two bit coordinates. That is, one is the window's upper leftmost coordinate (Px=Xa, Py=Ya) while the other is the window's lower rightmost coordinate defined by (Px=Xb=Xa+Dx, Py=Xb=Ya+Dy). Dx indicates the distance between Xa and Xb, and Dy indicates the distance between Ya and Yb. The origin of the coordinates (Px=0, Py=0) is positioned as in the third embodiment. The fourth embodiment is characterized in that the bit coordinates Xb is determined by adding Dx to Xa while Yb is determined by adding Dy to Yb. Other than this, the fourth embodiment is identical to the third embodiment.

Firstly, the CPU 16 writes Xa, Dx, Ya and Dy into the registers 74(1)–74(4), respectively. The adder 80(1) sums the contents of the registers 74(1) and 74(2) and thus, stores Xa+Dx therein. Similarly, the adder 80(2) sums the contents of the registers 74(3) and 74(4) and, accordingly stores Ya+Dy therein. Subsequently, the CPU 16 applies the bit position address AD to both of the comparators 76(1)–76(4) and the bitmap 54.

The operations of the comparators 74(1)–74(4) are identical to the comparators 64(1)–64(4) of FIG. 19, respectively, and hence further descriptions will be omitted for simplifying the descriptions.

It will be understood that the above disclosure is representative of only four possible embodiments and that various modifications can be made without departing from the concept of the instant invention.

What is claimed is:

1. An arrangement for displaying a plurality of video images in multiple windows in a computer graphics system, comprising:

first means for controlling an overall operation of said arrangement, said first means being coupled to a bus;

second means for storing one frame video image to be displayed on a display, said second means being coupled to said bus;

third means for displaying said one frame video image stored in said second means on said display, said third means being operatively coupled to said second means;

a plurality of fourth means for respectively acquiring a plurality of video images into said arrangement;

a plurality of fifth means interconnected respectively between said bus and said plurality of fourth means, said plurality of fifth means being arranged to respectively define a plurality of windows and being arranged to respectively transfer said plurality of video images to said second means through said plurality of windows, each of said fifth means being arranged to determine an exposed portion of a respective one of said windows in a case where said respective one of said windows is overlapped by another one of said windows and allowing the respective one of said video images to be supplied to said second means through said exposed portion of said respective one of said windows, wherein each of said plurality of fifth means receives successively a plurality of windows defining data from said first means when each of said plurality of fifth means defines a window, said plurality of windows defining data being respectively assigned a plurality of window identification (ID) numbers which are respectively applied to said plurality of fifth means from said first means, and wherein each of said fifth means includes, sixth means for storing the window ID number for said respective one of said windows and storing one of said plurality of window ID numbers successively applied thereto when each of said plurality of fifth means defines a respective one of said windows, said sixth means producing a first binary data which assumes a first logic level if the window ID numbers stored therein coincide and which assumes a second logic level if the window ID numbers stored therein do not coincide;

seventh means for defining said respective one of said windows therein if said first binary data indicates said first logic level, said seventh means defining said exposed portion of said respective one of said windows if both said first binary data indicates said second logic level and said another one of said windows overlaps said respective one of said windows; and eighth means for allowing said respective one of said video images to be transferred to said second means through said respective one of said windows or said exposed portion of said respective one of said windows, said eighth means being coupled to said seventh means and a respective one of said plurality of fourth means.

2. An arrangement as claimed in claim 1, wherein said sixth means includes:

a first register for storing said window ID number for said respective one of said windows therein until said plurality of fifth means define said plurality of windows respectively;

a second register for storing one of said plurality of window ID numbers successively applied thereto when each of said plurality of fifth means defines a respective one of said windows; and a comparator which is coupled to said first and second registers, said comparator comparing said window ID number for said respective one of said windows and said one of said plurality of window ID numbers and producing said first binary data.

3. An arrangement as claimed in claim 1, wherein said seventh means includes:

a bitmap having memory capacity of one frame, said bitmap producing a second binary data in response to an address signal applied thereto from said first means; and a first controller receiving three inputs which include said first binary data from said sixth means, one of said plurality of windows defining data, and said second binary data from said bitmap, said first controller implementing logical operations on said three inputs and writing the result of said logical operations into said bitmap in order to define said respective one of said windows or said exposed portion of said respective one of said windows.

4. An arrangement as claimed in claim 1, wherein said seventh means includes:

a first register for storing the window ID number for said respective one of said windows therein until said plurality of fifth means define said plurality of windows respectively;

a comparator which is coupled to receive said window ID number for said respective one of said windows and one of said plurality of window ID numbers when each of said plurality of fifth means defines a respective one of said windows, said comparator comparing said window ID number for said respective one of said windows and said one of said plurality of window ID numbers and producing said first binary data; and a second register coupled to receive said first binary data from said comparator and storing said binary value, said first binary data being applied to said seventh means.

5. An arrangement as claimed in claim 1, wherein said sixth means includes:

first to fourth registers which store two coordinates defining two opposite corners of said respective one of said windows, said two coordinates being applied from said first means; and ninth means receiving a frame bit address signal from said first means and said two coordinates, said ninth means producing said first binary data.

6. An arrangement as claimed in claim 1, wherein said sixth means includes:

first to fourth registers, said first and third registers receiving a coordinate which defines one corner of said respective one of said windows and which is applied from said first means, said second and fourth registers being supplied from said first means with two distances, on rectangular-coordinate axes, from said one corner to an opposite corner of said respective one of said windows;

first and second adders which are coupled to add contents stored in said first and second registers respectively, said first and second adders generating a coordinate defining the opposite corner of said respective one of said windows; and ninth means coupled to receive said two coordinates, said ninth means producing said first binary data in response to an address signal applied thereto from said first means.

7. An arrangement for displaying a plurality of video images in multiple windows in a computer graphics system, comprising:

a processor configured to control an overall operation of said arrangement, said processor being coupled to a bus;

a frame buffer coupled to said bus and configured to store one frame video image to be displayed on a display;

a video controller operatively coupled to said frame buffer and configured to display said one frame video image stored in said frame buffer on said display;

a plurality of video capture units each coupled to said bus and respectively configured to acquire a plurality of video images into said arrangement;

a plurality of window pixel data transfer controllers respectively coupled between a corresponding one of said video capture units and said bus, said plurality of window pixel data transfer controllers being arranged to respectively define a plurality of windows and to respectively transfer a corresponding one of said video images to said frame buffer through a corresponding one of said windows, each of said plurality of window pixel data transfer controllers being arranged to determine an exposed portion of a corresponding one of said windows in a case where said corresponding one of said windows is overlapped by another one of said windows, said each of said window pixel data transfer controllers allowing the corresponding one of said video images to be supplied to said frame buffer through said exposed portion of said corresponding one of said windows, wherein said video images are capable of being supplied to said frame buffer in parallel by said plurality of window pixel data transfer controllers, and wherein each of said plurality of window pixel data transfer controllers receives successively corresponding windows defining data from said processor when each of said plurality of window pixel data transfer controllers defines said corresponding one of said windows, each of said plurality of window pixel data transfer controllers being respectively assigned a corresponding window identification number which is respectively applied to said plurality of window pixel data transfer controllers from said processor.

* * * * *